United States Patent [19]

Ishikawa et al.

[11] Patent Number: 4,825,295
[45] Date of Patent: Apr. 25, 1989

[54] IMAGE READING APPARATUS

[75] Inventors: Tadashi Ishikawa, Urawa; Yoshitaka Watanabe, Tokyo; Toyokazu Mizogui, Kawasaki; Takao Kinoshita, Tokyo; Akihiko Tojo, Yokohama; Yasutomo Suzuki, Yokohama; Yoshiyuki Mizoguchi, Yokohama, all of Japan

[73] Assignee: Canon Kabushiki Kaisha, Tokyo, Japan

[21] Appl. No.: 894,195

[22] Filed: Aug. 7, 1986

[30] Foreign Application Priority Data

| Aug. 9, 1985 [JP] | Japan | 60-176083 |
| Feb. 24, 1986 [JP] | Japan | 61-27488 |
| Mar. 26, 1986 [JP] | Japan | 61-66032 |
| Mar. 28, 1986 [JP] | Japan | 61-68507 |
| May 14, 1986 [JP] | Japan | 61-108489 |

[51] Int. Cl.$^4$ .............................................. H04N 5/64
[52] U.S. Cl. .................................... 358/254; 358/249; 358/294; 354/290
[58] Field of Search ................. 358/254, 280, 76, 102, 358/248, 249, 294; 380/369; 354/290; 355/5

[56] References Cited

U.S. PATENT DOCUMENTS 4,636,863  1/1987  Maiyom ........................ 358/293

FOREIGN PATENT DOCUMENTS 3434238  5/1985  Fed. Rep. of Germany ...... 358/102

Primary Examiner—Edward L. Coles, Sr.
Attorney, Agent, or Firm—Fitzpatrick, Cella, Harper & Scinto

[57] ABSTRACT

An image reading apparatus comprising: a mounting plate of an image to be read; a supporting device coupled with the mounting plate; a converter, supported by the supporting device, for converting the image to an electric signal; and a monitor display unit, supported by the supporting device, for displaying on the basis of the electric signal.

30 Claims, 14 Drawing Sheets

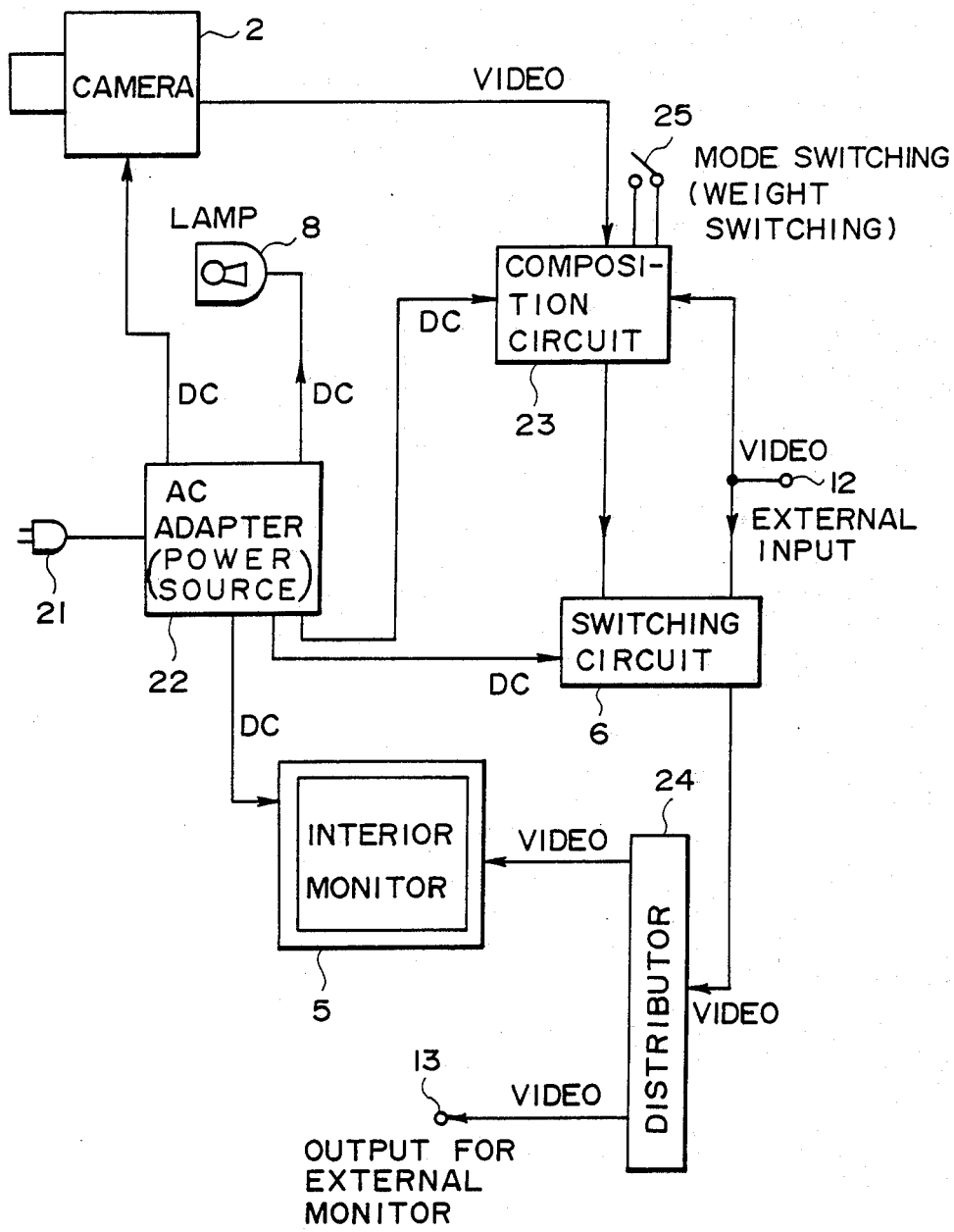
F I G. 4

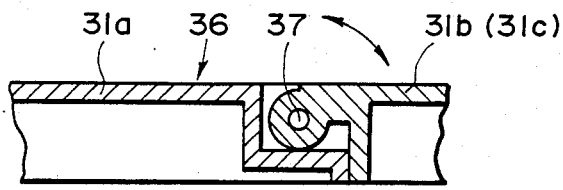
F I G. 10
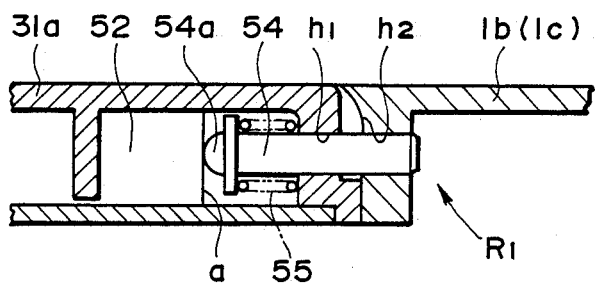
F I G. 12
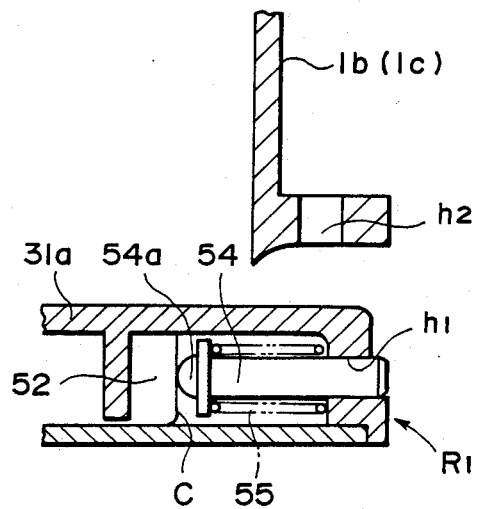
F I G. 13

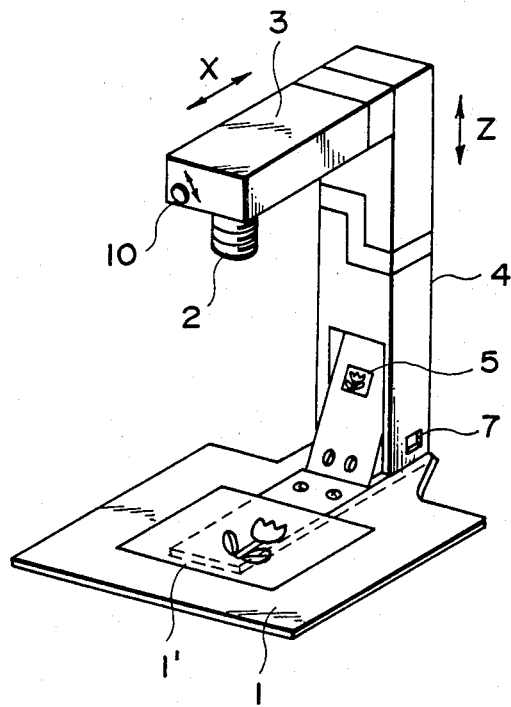
F I G. 20

IMAGE READING APPARATUS

BACKGROUND OF THE INVENTION

1. Field of the Invention

The present invention relates to an image reading apparatus for converting an image to an electric signal.

2. Related Background Art

A conventional image reading apparatus has been used as an apparatus for composing, for example, handwriting telop cards onto a video screen. In such a conventional image reading apparatus, a mounting plate onto which an image to be read is put and a camera having a photoelectric converting unit to read the image are separately formed. Further, a television apparatus is also separately connected to this image reading apparatus and used as a monitor display unit to monitor and display the image on the basis of the electric signal converted by the photoelectric converting unit.

In the conventional image reading apparatus, the mounting plate, photoelectric converting unit, and monitor display unit are separately arranged as mentioned above. Therefore, this apparatus has the drawback that the photoelectric converting unit and monitor display unit must be connected to use this apparatus.

On the other hand, the apparatus in which the mounting plate and camera unit are integrally supported is disclosed in, for example, U.S. Pat. No. 4,574,318. However, this apparatus also has the drawback that the monitor display unit must be connected to use the apparatus.

SUMMARY OF THE INVENTION

It is one object of the present invention to solve the above-mentioned problems.

Another object of the invention is to provide a compact-sized image reading apparatus which can be accommodated in a small space.

Another object of the invention is to provide an image reading apparatus which can preferably read an original put on the mounting plate.

Still another object of the invention is to provide an image reading apparatus which can read an original put on the mounting plate and can simultaneously preferably monitor the read image.

According to one embodiment of the invention to accomplish the above objects, there is provided an image reading apparatus comprising: a mounting plate onto which an image to be read is put; supporting means which is coupled to the mounting plate; means, supported by this supporting means, for converting the image to an electric signal; and monitor display means, supported by the supporting means, for displaying an image on the basis of the converted electric signal.

Yet another object of the invention is to provide an image reading apparatus which can preferably read a color image on an original put on the mounting plate.

The above and other objects and features of the present invention will become apparent from the following detailed description and the appended claims with reference to the accompanying drawings.

BRIEF DESCRIPTION OF THE DRAWINGS

FIG. 4 is an electrical circuit block diagram of the image reading apparatus shown in FIG. 1;

FIGS. 8 and 9 are perspective views of an image reading apparatus of the second embodiment of the present invention, in which FIG. 8 shows a state in which a mounting plate is open and FIG. 9 shows a state in which the mounting plate was folded up;

FIG. 10 is a cross sectional view showing the main part in FIGS. 8 and 9;

FIGS. 12 to 15 are enlarged cross sectional views of the main part in FIG. 11;

FIG. 20 is a perspective view of an image feading apparatus of the fourth embodiment of the invention;

DESCRIPTION OF PREFERRED EMBODIMENTS

Figure 1:
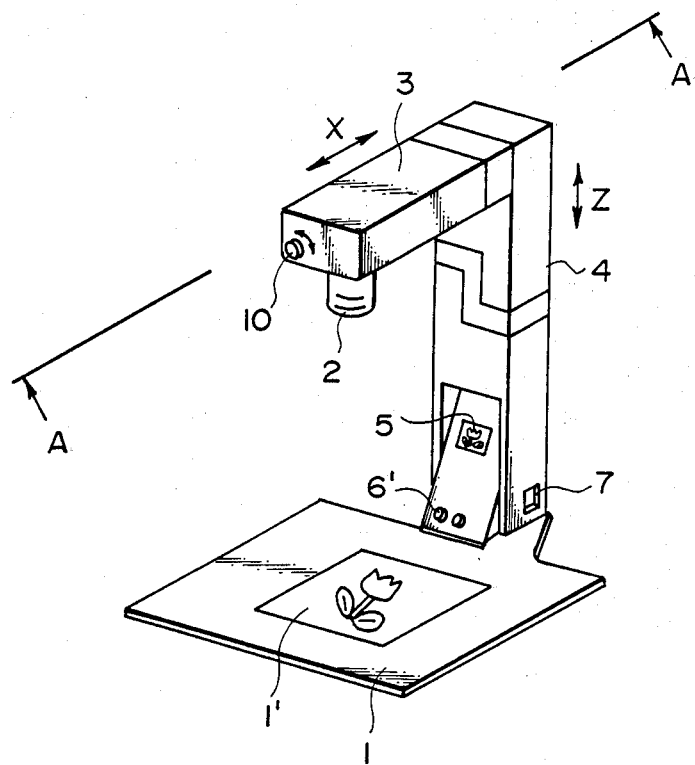
FIGS. 1 and 2 are a perspective view and a cross sectional view of an image reading apparatus of the first embodiment of the present invention, respectively.
Figure 2:
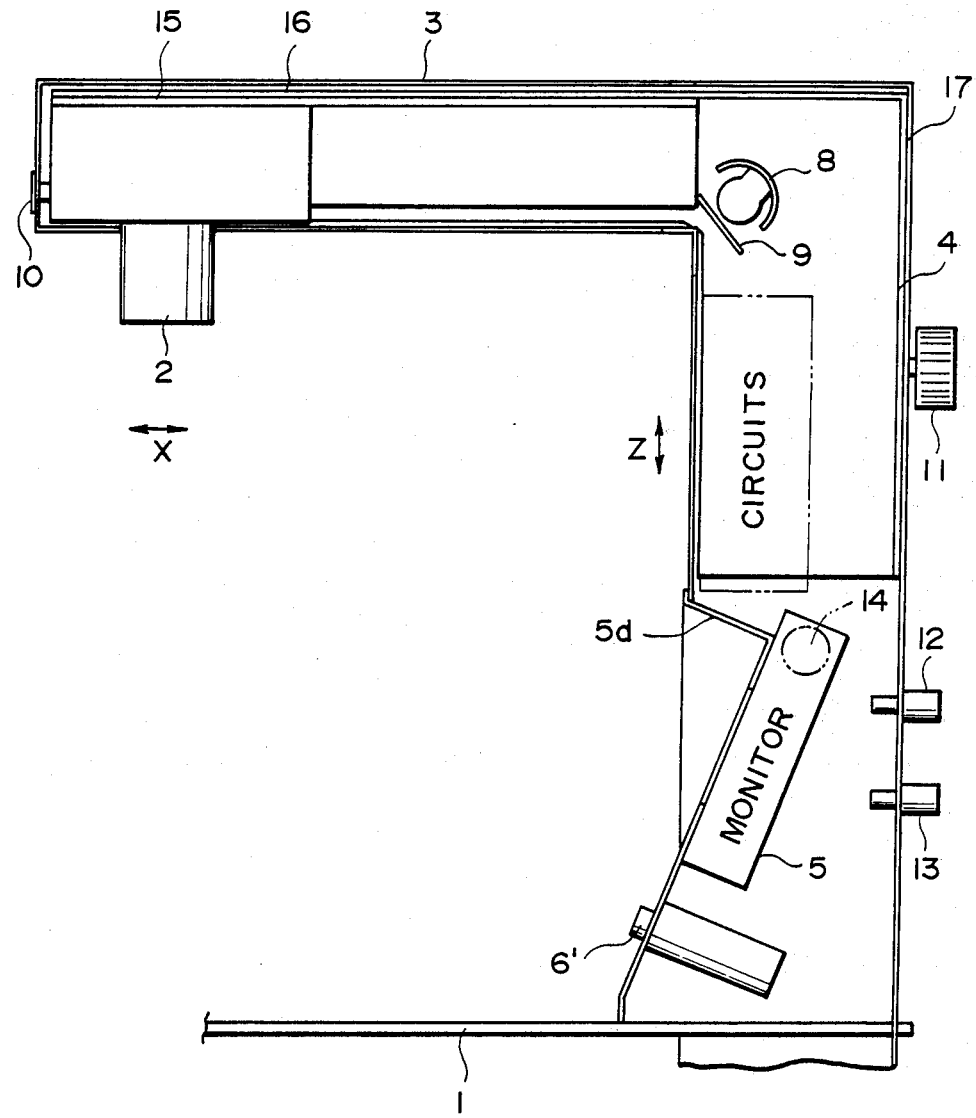

FIGS. 1 and 2 are a perspective view and a cross sectional view of an image reading apparatus of an embodiment of the present invention, respectively;

In FIGS. 1 and 2, an image 1' to be read is put on a mounting plate 1. A camera 2 has a photoelectric converting unit to read an image of an original or the like, which will be explained hereinafter. The surface of the mounting plate 1 on the side of the camera 2 is gray as an achromatic color in order to adjust the white balance of the camera 2. The color of the surface of the mounting plate 1 on the side of the camera 2 may be set to white. However, if a large amount of light enters the photoelectric converting unit in the camera 2, the output of the photoelectric converting unit will be saturated, so that the white balance cannot be properly adjusted. To prevent this, it is desirable to use the gray surface having a low reflectance rather than the white surface. The surface of the mounting plate 1 is formed by a diffusion reflecting plate to prevent the irregular reflection of light from entering the camera 2 from the mounting plate 1. The camera 2 is fixed and supported by a horizontal supporting portion 3, which will be explained hereinafter and has a color photo electric converting unit. The horizontal supporting portion 3 is slidable in the X direction shown in the diagrams and can move an area to be photographed by the camera 2. A vertical supporting portion 4 is fixed to the horizontal supporting portion 3 and is slidable in the Z direction shown in the diagrams. This constitution will be described hereinbelow with reference to FIG. 3. A monitor display unit 5, a switch 6' to change over a switching circuit 6, which will be explained hereinafter, and a power switch 7 are provided on the side of the mounting plate 1 below the vertical supporting portion 4. The monitor display unit 5 is obliquely attached below the vertical supporting portion 4 so that the operator in front of the mounting plate 1 can easily see an image which is displayed on the monitor display unit 5. The display unit 5 is arranged so that the distance between the operator and this display unit is equal to the distance between the operator and the mounting plate 1. Further, the display unit 5 using a liquid crystal television is arranged behind the front side of the vertical supporting portion 4 by only the distance of a pent roof $5d$ to prevent that the light fluxes from a lamp 8, which will be explained hereinafter, enter and the image on the display unit 5 becomes hard to see, and at the same time the display unit 5 is backwardly inclined as mentioned above. The lamp 8 illuminates the whole area of the mounting plate 1 through a diffusing plate 9. Further, according to the embodiment, the lamp 8 obliquely irradiates the mounting plate 1 from the upper position, thereby preventing that the light fluxes from the lamp 8 are reflected by the surface of the mounting plate 1 and directly enter the camera 2. A switch member 10 is provided to adjust the white balance of the camera 2. By turning on the switch member 10, the white balance can be automatically adjusted. It is also possible to manually select the white balance adjustment in accordance with the kind of external light such as, for example, fluorescent lamp, daylight, or incandescent lamp light by turning on the switch member 10. A fixing knob 11 is provided to slide or fix the vertical supporting portion 4. An external input terminal 12 is provided to input a video signal from the outside. The external input signal from the input terminal 12 is output from the monitor display unit 5 and from a monitor output terminal 13. An illuminating lamp 14 illuminates the monitor display unit 5. Reference numeral 15 denotes a slide plate, which will be explained hereinafter, 16 is a vertical moving plate, and 17 is a fixed plate to fix the mounting plate 1.

According to the embodiment, the mounting plate 1, camera 2, and monitor 5 are integrally fixed by the horizontal and vertical supporting portions 3 and 4.

The mechanisms of horizontal and vertical supporting portions 3 and 4 will now be described in detail with reference to FIG. 3..

Figure 3:
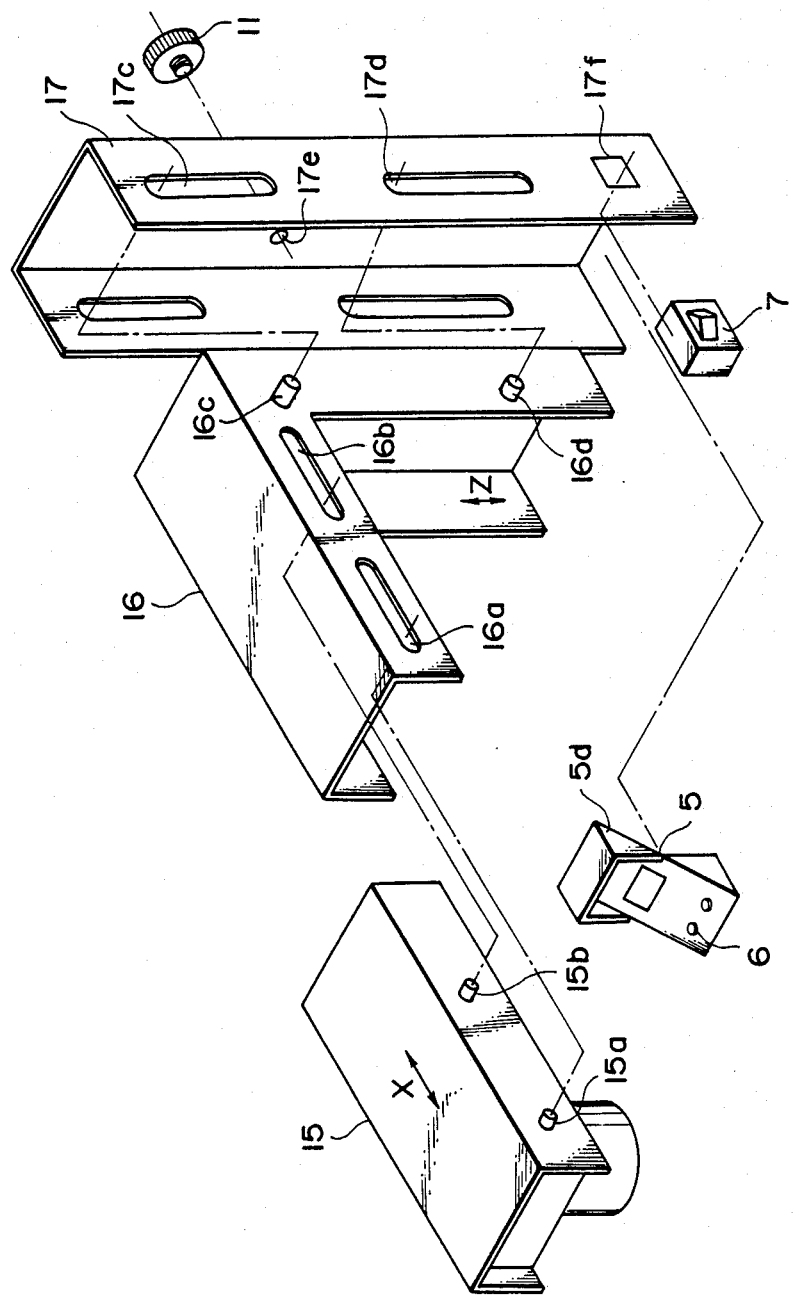
FIG. 3 is an exploded perspective view of mechanisms of a horizontal supporting portion 3 and a vertical supporting portion 4.

In FIG. 3, the slide plate 15 is slidable in the X direction and has carrier strap pegs $15a$ and $15b$. The slide plate 15 also functions as a heat radiating plate of the camera 2. The vertical moving plate 16 has guide grooves $16a$ and $16b$ into which the carrier strap pegs $15a$ and $15b$ are inserted. The plate 16 also has carrier strap pegs $16c$ and $16d$ so as to be slidable in the Z direction. The fixed plate 17 is fixed onto the mounting plate 1 and has guide grooves $17c$ and $17d$ into which the carrier strap pegs $16c$ and $16d$ are inserted. Further, a receiving hole $17e$ into which the fixing knob 11 is inserted and a frame $17f$ into which the switch 7 is inserted are formed in the fixed plate 17.

Only the carrier strap pegs and guide grooves formed at the positions which can be seen from this side in FIG. 3 have been described above. However, the similar carrier strap pegs and guide grooves are also formed on the side of the rear surfaces in the diagram.

In the embodiment, the slide plate 15 is slidable in the X direction with respect to the vertical moving plate 16, and further the plate 16 is slidable in the Y direction with regard to the fixed plate 17. The fixing knob 11 is rotated to fix the position of the vertical moving plate 16 to the fixed plate 17. The plate 16 is fixed by abutting the front edge of the knob 11 to the plate 16 with a pressure.

Therefore, according to the embodiment, the region of an object which is put on the mounting plate 1 and will be photographed by the camera 2 can be varied by changing the position in the X direction of the camera 2 by sliding the horizontal supporting portion 3. On the other hand, the size of area of the object which is put on the mounting plate 1 and will be photographed by the camera 2 can be varied by changing the position in the Z direction to the camera 2 by sliding the vertical supporting portion 4.

An electrical circuit of the foregoing image reading apparatus will now be described in detail hereinbelow with reference to FIG. 4.

FIG. 4 is a diagram showing an example of a constitution of an electrical circuit block of the image reading apparatus shown in FIG. 1. In FIG. 4, the same parts and components as those shown in FIGS. 1 to 3 are designated by the same reference numerals.

Reference numeral 21 denotes a power plug; 22 an AC adapter as a power source; and 23 is a composition circuit for composing the video output of the camera 2 and an external video output at the ratio of, for example, 1:1 when a mode change-over switch 25 is ON as will be explained hereinafter and for outputting only the video output of the camera 2 when the switch 25 is OFF. A distributor 24 distributes the video signal from the switching circuit 6 to the internal monitor display unit 5 and to the external monitor output terminal 13 as will be explained hereinafter.

The embodiment of the invention is characterized in that the power sources of the camera 2, display unit 5, switching circuit 6, lamp 8, and composition circuit 23 are obtained from the common AC adapter 22.

Thus, there is no need to individually provide the power sources for the camera 2, internal monitor 5, lamp 8, switching circuit 6, and composition circuit 23, so that there is the advantage such that the whole constitution is simplified.

Figure 5:
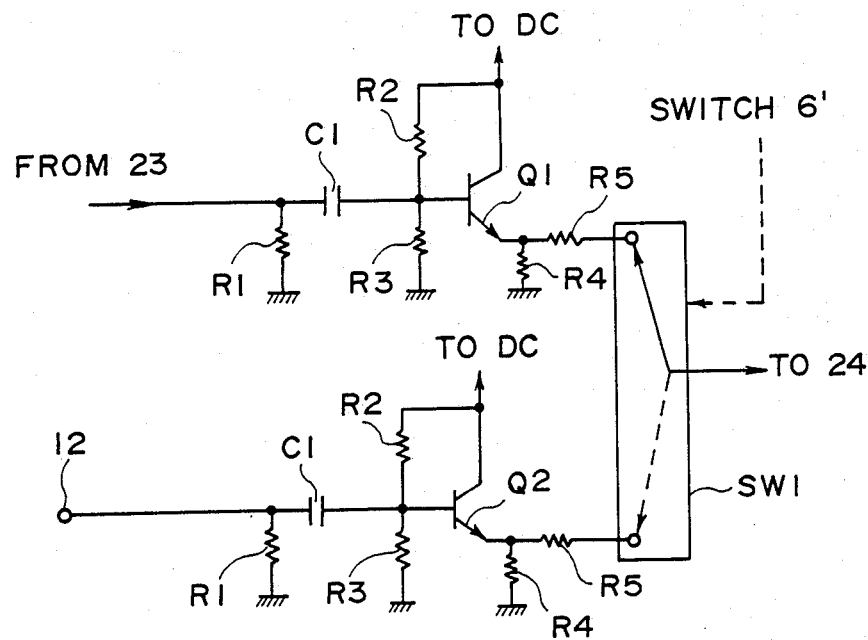
FIG. 5 is a circuit diagram of a switching circuit 6 shown in FIG. 4.

FIG. 5 is a diagram showing an example of an arrangement of the switching circuit 6. In the diagram, $R_1$ denotes a resistor arranged between a coupling capacitor $C_1$ and the ground; $R_2$ and $R_3$ are bias setting resistors; $Q_1$ and $Q_2$ buffer transistors; $R_4$ and $R_5$ resistors connected to the emitters of transistors $Q_1$ and $Q_2$; and $SW_1$ a contact which is switched by the change-over switch 6'. In the embodiment, a power source DC of the switching circuit 6 is obtained from the AC adapter 22 as a common power source of the image reading apparatus as mentioned above.

Figure 6:
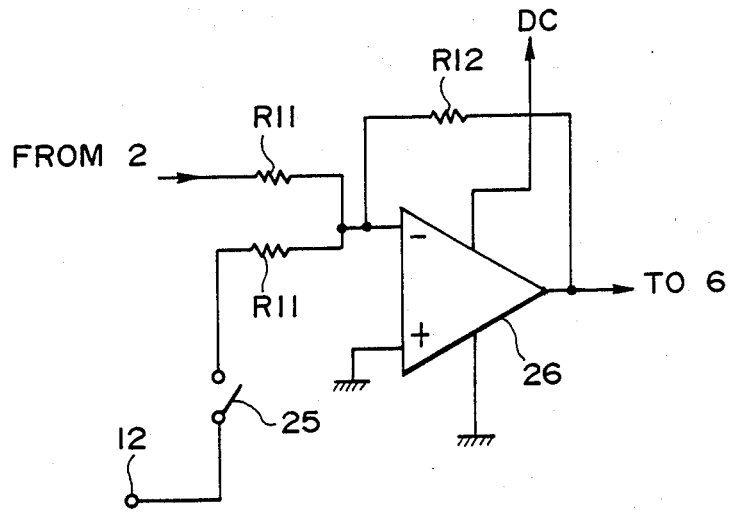
FIG. 6 is a circuit diagram of a composition circuit 23 shown in FIG. 4.

FIG. 6 is a diagram showing an example of an arrangement of the composition circuit 23. $R_{11}$ and $R_{12}$ denote resistors and 26 indicates an operational amplifier. When the mode change-over switch 25 is turned on, the output $e_0$ of the operational amplifier 26 becomes $$e_0 = (R_{12}/R_{11})(V_1 + V_2)$$

(where, $V_1$ is a signal from the camera 2 and $V_2$ is a signal from the external input terminal).

When the switch 25 is OFF, the output $e_0$ of the operational amplifier 26 becomes $$e_0 = (R_{12}/R_{11})V_1$$

The power source DC of the operational amplifier 26 is also obtained from the AC adapter 22 as a common power source.

Figure 7:
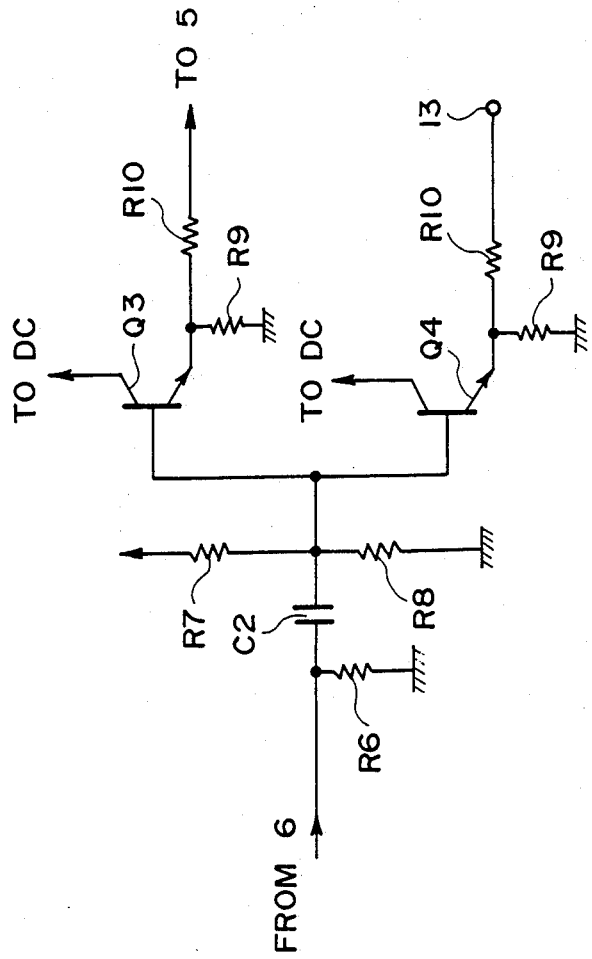
FIG. 7 is a circuit diagram of a distributor 24 shown in FIG. 4.

FIG. 7 is a diagram showing an example of an arrangement of the distributor 24. $R_6$ denotes a resistor arranged between a coupling capacitor $C_2$ and the ground; $R_7$ and $R_8$ are bias resistors; $Q_3$ and $Q_4$ are buffer transistors; and $R_9$ and $R_{10}$ resistors connected to the emitters of the transistors $Q_3$ and $Q_4$.

With this arrangement, the video signal from the switching circuit 6 is distributed to the internal monitor 5 and external monitor output terminal 13.

In the diagram, the power source DC to which the collectors of the transistors $Q_3$ and $Q_4$ are connected is also derived from the AC adapter 22 as a common power source.

As described above, according to the embodiment, the mounting plate 1, camera 2, and monitor display unit 5 are integrally supported and, further, the power sources of the camera 2 and display unit 5 are commonly applied. Therefore, when the image reading apparatus is used, there is no need to respectively connect the camera 2 and display unit 5 and the image reading apparatus having the excellent operation efficiency can be provided.

As described above, according to the embodiment, the photoelectric converting unit for converting an image to be read into an electric signal and the monitor display unit for displaying the monitor image on the basis of this electric signal are supported by the mounting plate onto which an original having the image to be read is put and by the supporting members coupled with the mounting plate. Thus, there is the advantage such that it is unnecessary to respectively connect the photoelectric converting unit and monitor display unit to the mounting plate as compared with the conventional image reading apparatus in which since the photoelectric converting unit, monitor unit, and mounting plate are separately formed, these components must be respectively connected when the apparatus is used.

In the image reading apparatus of the embodiment, the mounting plate 1 and supporting members for supporting the camera 2 cannot be separated, so that the size of image reading apparatus when it is packaged is determined by the mounting plate 2 of a large plane shape, resulting in enlargement of the size of package box. Therefore, the transporting expenses increase, the portability is bad, the wide accommodation space is needed, and the accommodation efficiency when the apparatus is not used is low.

Figure 8:
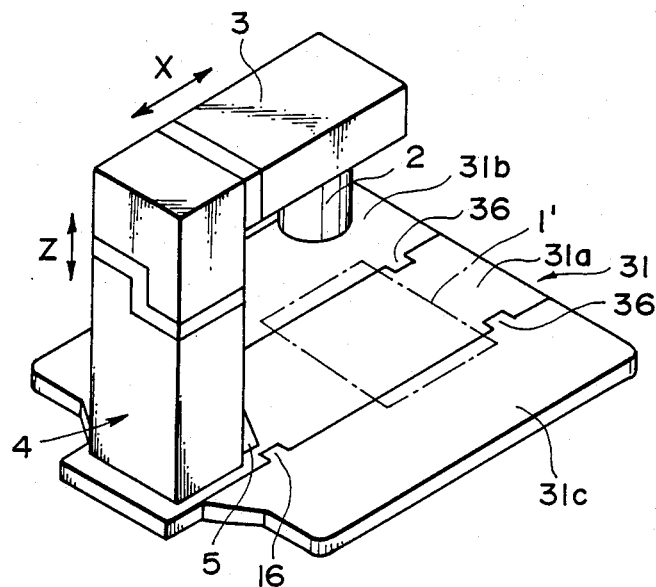
Figure 9:
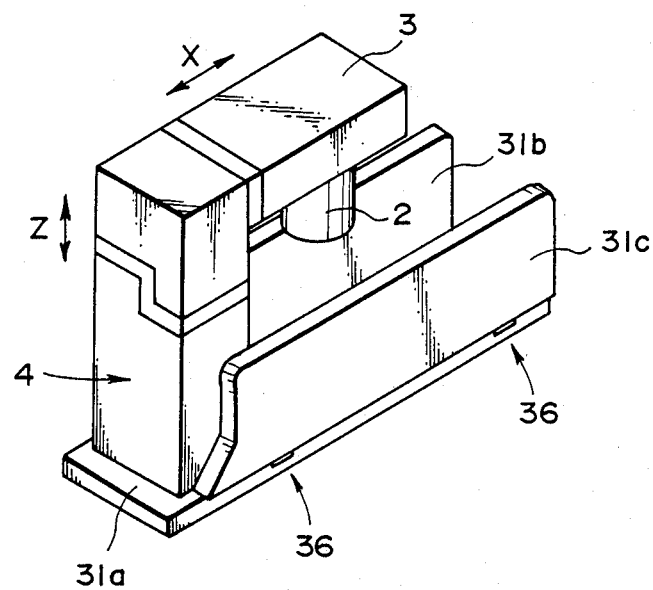

An image reading apparatus which can be efficiently accommodated when it is not used, therefore, will now be described with reference to FIGS. 8 to 10. FIGS. 8 and 9 are perspective views of such an easy-to-accommodate apparatus and FIG. 10 is a cross sectional view of the main part thereof.

In FIG. 8, the image 1' to be read is put on a mounting plate 31. The mounting plate 31 is constituted by a rectangular fixed plate portion 31a and rectangular movable plate portions 31b and 31c. As shown in FIG. 9, the movable plate portions 31b and 31c are attached to both sides in the longitudinal direction of the fixed plate portion 31a along both sides of the vertical supporting member 4 through hinge portions 36 so as to be folded up at a right angle. FIG. 10 shows a detailed constitution of each of the hinge portion 36, in which the hinge is composed of a pin 37.

As described above, as shown in FIG. 9, the mounting plate 31 in this embodiment is constituted such that the movable plate portions 31b and 31c can be folded up at a right angle along both sides of the vertical supporting member 4 at the hinge portions 36. Therefore, the compact-sized image reading apparatus can be realized and the size of apparatus when it is packaged can be reduced. Thus, the package can be miniaturized, the transporting expenses can be also reduced, the apparatus can be accommodated in a small space, and the accommodation efficiency is also improved. In addition, the portability is also improved because of the small package box.

In the embodiment shown in FIGS. 8 to 10, the movable plate portions 31b and 31c of the mounting plate 31 are not held at the use positions as shown in FIG. 8 nor kept at the folded-up positions as shown in FIG. 9, respectively. Therefore, the following problems might be caused.

(1) For example, when the image reading apparatus put on a table in the operative state as shown in FIG. 8 is moved onto another desk, if the movable plate portions 31b and 31c are grasped by the hands, the apparatus cannot be lifted up since the movable plate portions will be upwardly rotated. To prevent this, the user must grasp the fixed plate portion 31a. In this case, however, since it is difficult to grasp the apparatus, the apparatus will be unbalanced and will become unstable, so that not only it is hard to carry the apparatus but also it is dangerous.

(2) When the image reading apparatus is in the operative mode, the vertical supporting plate 4 and camera 2 are supported by only the fixed plate portion 31a. Thus, there is the fear such that the apparatus may fall down to the side of the movable plate portion 31b or 31c by slight vibration, slight inclination at the location where the apparatus is set, force to be applied in operation, or the like, so that the apparatus may be damaged. In this case, it is also dangerous.

(3) When the movable plate portions are folded up to package the apparatus, there is the risk that the movable plate portions may fall down and the apparatus may be damaged by the shock at this time or the hand of the user may be sandwiched between the movable plate portion and the fixed plate portion. Consequently, it is difficult to package the apparatus.

An image reading apparatus which hardly falls down and can be easily carried and packaged by further improving the foregoing drawbacks will now be described with reference to FIGS. 11 to 15.

This embodiment relates to an image reading apparatus having holding means for holding the mounting plate in a predetermined state.

When the movable plate portions have once been held at the operative positions by such holding means, the fixed plate portion and movable plate portions function as a single mounting plate which cannot be folded up as long as the holding means functions. Therefore, in the operative mode of the apparatus, the supporting members of the image pickup unit are supported on the single mounting plate and the apparatus cannot easily fall down by the vibration, force to be applied in operation, or the like. In addition, when the apparatus is carried to another near location as well, it can be easily carried since it can be lifted up with the movable plate portions grasped by the hands.

On the other hand, when the movable plate portions have once been held at the folded-up positions by the holding means, the movable plate portions do not fall down to the operative positions from the folded-up positions so long as the holding means functions. Consequently, there is no risk that when the apparatus is packaged, the folded movable plate portions fall down and the hand is sandwiched between the fixed plate portion and the movable plate portion and the apparatus is damaged by the shock at this time. The apparatus can be, accordingly, easily packaged.

Figure 11:
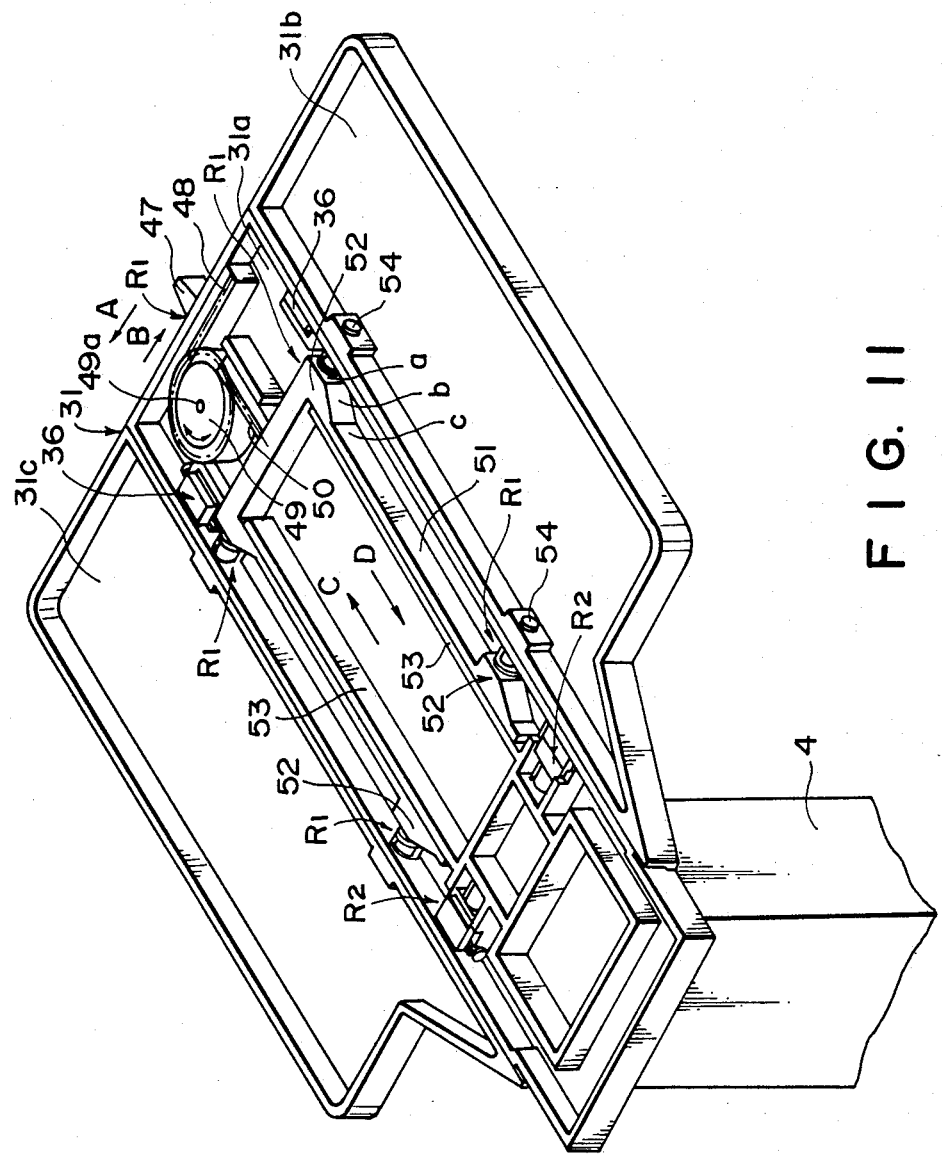
FIG. 11 is a perspective view of an image reading apparatus in the third embodiment of the invention when it is seen from the back side after a bottom plate has been removed.

FIGS. 11 to 15 show an image reading apparatus of such an embodiment. FIG. 11 is a perspective view seen from the back side after the bottom plate of the apparatus was removed. FIGS. 12 to 15 are enlarged cross sectional diagrams of the main part in FIG. 11.

In each diagram, the parts and components which are the same as or correspond to those shown in the foregoing embodiments are designated by the same reference numerals. $R_1$ denotes first holding means for holding the movable plate portions 31b and 31c to the operative positions. Namely, the first holding means is the first locking apparatus for locking and fixing the movable plate portions 31b and 31c to the fixed plate portion 31a so that the plate portions 31b, 31c, and 31a are aligned to the same surface, respectively. $R_2$ represents second holding means for holding the movable plate portions 31b and 31c to the holded positions. Namely, the second holding means is the second locking apparatus for locking and fixing the movable plate portions 31b and 31c to the fixed plate portion 31a at the positions where the movable plate portions were folded up on both sides of the vertical supporting member 4.

In the first locking apparatus $R_1$, reference numeral 47 denotes an operation knob and 48 is a first rack constituted integrally with the knob 47. By moving the knob 47 in the direction indicated by an arrow A or B, the first rack 48 can be also moved in the same direction. A gear 49 is come into engagement with the first rack 48 and can rotate around a rotary shaft 49a as a rotational center. Numeral 50 denotes a second rack adapted to be come into engagement with the gear 49; 51 is a U-shaped cam member to which the second rack 50 is fixed; and 52 represents four locking cams formed for the cam member 51. The locking cams 52 are provided to drive four locking pins 54, which will be explained hereinafter. A guide frame 53 is fixed to the fixed plate portion 31a and guides the cam member 51 in the directions C and D indicated by arrows. The locking pins 54 are inserted into pin holes $h_1$ formed at the positions corresponding to the locking cams 52 as the flange portions of the fixed plate portion 31a. Total four locking pins 54 are provided. As shown in FIGS. 12 and 13, head portions 54a of the locking pins 54 are urged by springs 55 to always abut on four locking cams 52. As shown in FIG. 12, when the head portions 54a abut on first cam surfaces a of the locking cams 52, the locking pins 54 are inserted into pin holes $h_2$ in the flange portions of the movable plate portions 31b and 31c, thereby locking these movable plate portions at the operative positions. When the head portions 54a are removed from the first cam members 51 and abut on third cam surfaces c through second cam surfaces b, the locking pins 54 are out of the pin holes $h_2$ in the movable plate portions 31b and 31c as shown in FIG. 13, thereby enabling these movable plate portions to be folded up.

Figure 14:
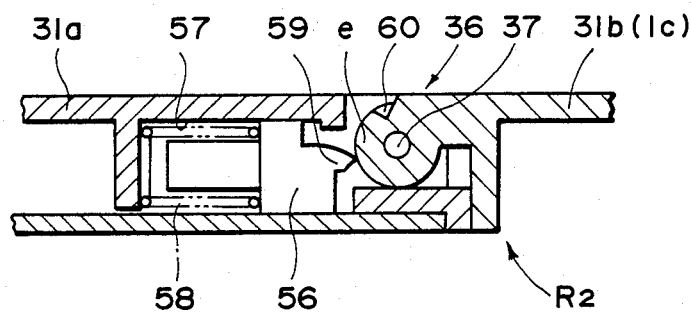
Figure 15:
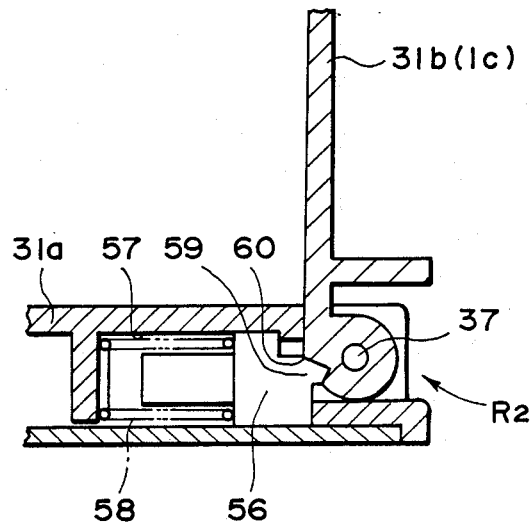

FIGS. 14 and 15 show the details of the second locking apparatus $R_2$. In the diagrams, a locking member 56 is inserted into a guide groove 57 formed in the fixed plate portion 31a. The locking member 56 is urged to the side of the hinge portion 36 by a spring 58. Numeral 59 denotes a locking claw projected from the locking member 56, and 60 is a retaining portion of the locking claw 59 formed for a bearing portion e of each of the movable plate portions 31b and 31c. When these movable plate portions are folded up along the vertical supporting member 4, the locking claws 59 are retained by retaining portions 60, thereby allowing the movable plate portions to be locked at the folded positions. These locked states can be released by applying predetermined forces to the movable plate portions 31b and 31c to incline them. Namely, the urging forces of the springs 58 are previously adjusted in accordance with those predetermined forces.

The operation will now be described.

As shown in FIG. 11, the movable plate portions 31b and 31c at the operative positions can be folded up by moving the knob 47 in the direction indicated by an arrow A. When the knob 47 is moved in the A direction, the gear 49 rotates to move the cam member 51 in the direction of the arrow C. Thus, the locking pins 54 at the positions shown in FIG. 12 are removed from the first cam surfaces a of the locking cams 52 and abut on the third cam surfaces c and are removed from the pin holes $h_2$ in the movable plate portions 31b and 31c as shown in FIG. 13, so that the locked states are released. Thereafter, by folding up the movable plate portions 31b and 31c at the operative positions in FIG. 14 as shown in FIG. 15, the locking claws 59 in the second locking apparatus $R_2$ are retained by the retaining portions 60 of the movable plate portions 31b and 31c. Thus, these movable plate portions are locked to the folded positions.

On the contrary, when the movable plate portions 31b and 31c at the folded positions as shown in FIG. 15 are set to the operative positions as shown in FIGS. 11 and 14, these movable plate portions are applied with predetermined forces and fall down. Then, the locking claws 59 disengage from the retaining portions 60, so that the movable plate portions easily fall down to the operative positions. By moving the knob 47 in the direction indicated by an arrow B in this state, the cam member 51 moves in the direction indicated by an arrow D. Thus, the locking cams 52 press the locking pins 54 and these pins are inserted into the pin holes $h_2$ in the movable plate portions 31b and 31c. In this manner, the movable plate portions are locked to the fixed plate portion 31a.

As described above, according to this embodiment, the movable plate portions 31b and 31c are locked and held to the operative positions by the first locking apparatus $R_1$. Therefore, in the operative mode of the image reading apparatus, the vertical supporting member 4 is supported by single mounting plate 1 constituted integrally by the movable plate portions 31b and 31c and fixed plate portion 31a. Thus, the apparatus is hard to fall down by the vibration, force to be applied in operation, or the like. In addition, the apparatus can be easily carried since it can be lifted up with the movable plate portions 31b and 31c grasped.

In addition, the movable plate portions 31b and 31c are locked and held to the folded positions by the second locking apparatus R$_2$. Therefore, that the movable plate portions are prevented from falling down upon packaging and the hand is sandwiched between the fixed plate portion and the movable plate portion and the apparatus is damaged by the shock at this time. Thus, the image reading apparatus can be easily packaged.

The second locking apparatus R$_2$ may be also substituted by another constitution such that, for example, the movable plate portions are locked by the magnetic force which is generated by the combination of a magnet and a magnetic material (not shown).

As described above, according to the embodiment shown in FIGS. 11 to 15, it is possible to obtain the portable image reading apparatus which can be easily packaged and which is unlikely to fall down.

As mentioned above, the color of the surface of the mounting plate 1 is set to white or achromatic gray color. By setting such a color, the following effects are obtained as will be explained hereinbelow.

(1) Although the apparatuses in the foregoing embodiments are of the reflection illumination type, originals and images for use in the apparatuses of the type using the transmitted illumination (for example, overhead projector and the like) can be directly used in the apparatuses of the embodiments.

(2) The white balance of the camera unit 2 can be adjusted by taking the mounting plate.

However, in the case where a solid object is put on the achromatic mounting plate 1, the shadow of solid object is projected onto the surface of the mounting plate 1, so that there is the tendency that the output image of the camera 2 becomes hard to see.

Figure 16:
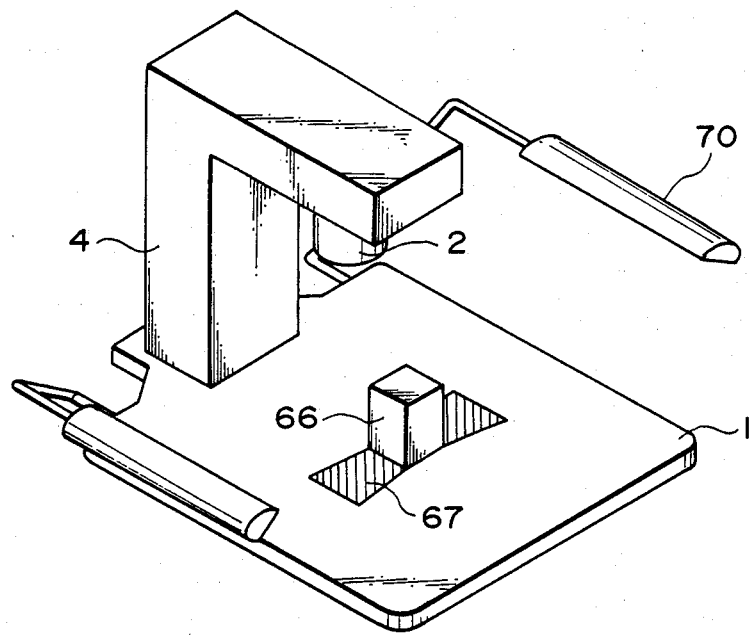
FIG. 16 is a diagram showing a state in which an illuminating apparatus 70 was attached to the apparatus shown in FIG. 1.

On the other hand, as shown in FIG. 16, when an illuminating apparatus 70 is used to increase the light amount on the mounting plate 1, a shadow 67 of a solid object 66 becomes further clear, resulting in further deterioration of the quality of output image of the camera 2. Therefore, in such a case, there is still more room for improvement.

Figures 17A, 17B:
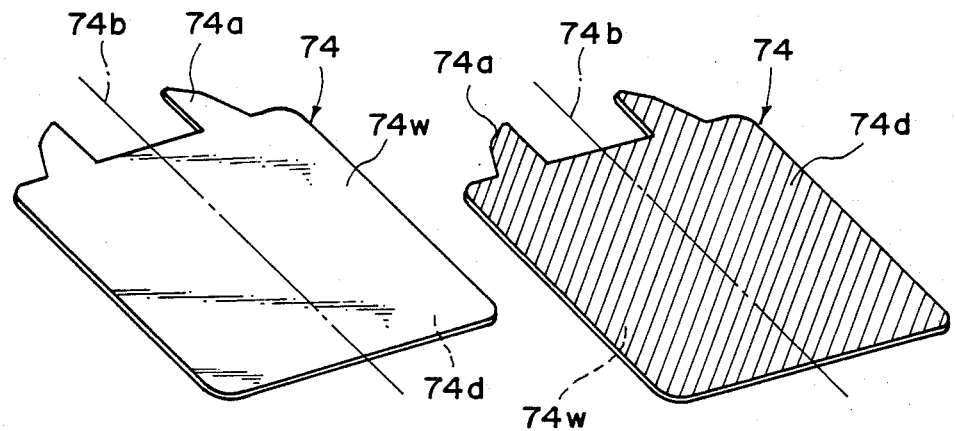
FIGS. 17A and 17B are perspective views of the front and rear surfaces of a mounting plate 74 in the third embodiment of the invention, respectively.
Figure 18:
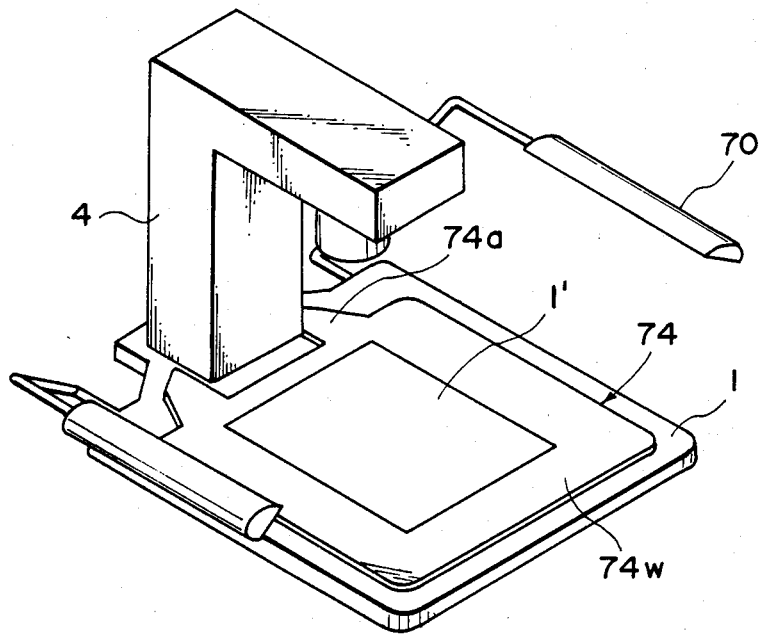
FIGS. 18 and 19 are perspective views showing examples in the cases of using the front and rear surfaces of the mounting plate shown in FIGS. 17A and 17B, respectively.
Figure 19:
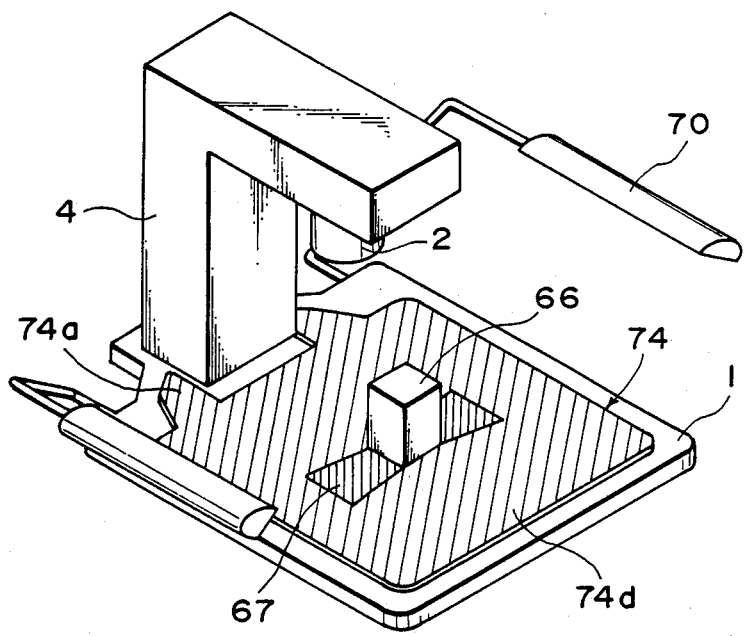

With reference to FIGS. 17 to 19, an explanation will now be made with respect to an improved embodiment of the foregoing embodiments. Namely, in this embodiment, a mounting sheet is disposed on the mounting plate, both surfaces of the mounting sheet are set to different colors, and the mounting sheet is turned upside down and used as necessary.

FIGS. 17A and 17B are perspective views of front and back surfaces of an embodiment of a mounting sheet 74 of an image reading apparatus of the embodiment, respectively. FIGS. 18 and 19 are perspective views showing respective examples of the image reading apparatus in the cases where the front and back surfaces of the mounting sheet were used for different purposes, respectively.

In this embodiment, the mounting sheet 74 in which the front and back surfaces have different colors is disposed on the mounting plate 1.

Further, as shown in FIGS. 17A and 17B, the mounting sheet 74 is formed symmetrically with regard to a reference line 74b as a central line, a pair of symmetrical projecting portions 74a are formed at the edge portions of one side, and thereby enabling the mounting sheet 74 to be positioned with regard to the vertical supporting member 4 as shown in FIGS. 18 and 19. Further, front and back sides 74w and 74d of the mounting sheet 74 are set to a whity-color and a blacky-color, respectively, thereby making it possible to use the mounting sheet by turning it upside down and vice versa.

With this constitution, the front and back sides of the mounting sheet 74 are used as necessary, respectively, in the following manner.

(1) When the white balance is adjusted or when an original for use in a transmitted illuminating apparatus such as an overhead projector or the like is used, the whitish front side 74w of the mounting sheet 74 is used as shown in FIG. 18. Numeral 1' denotes the transparent original put on the front side 74w.

(2) On the contrary, in the case of photographing an object such as a solid object 66 or the like which can easily produce the distinct shadow by the illumination from the illuminating apparatus 70, the mounting sheet 74 is turned upside down as shown in FIG. 19 and the blackish back side 74d is used as the front side. Thus, the shadow 67 of the solid object 66 will become inconspicuous and the output image of the camera unit can be improved so as to be easy to see.

As described above, according to the embodiment, the front and back sides of different colors of the mounting sheet can be turned upside down and used as necessary. Therefore, an image can be efficiently input in any cases of the adjustment of white balance, the original for the transmitted illumination, the solid object which can produce the clear shadow, and the like.

In the apparatus of the above embodiment, where the mounting plate 1 and vertical supporting member 4 cannot be separated, the size of apparatus is determined by the size of mounting plate. In the embodiment shown in FIGS. 8 to 15, on the other hand, the accommodating space is reduced since the mounting plate can be folded up.

An image reading apparatus which can further reduce the accommodating space will now be described with reference to FIGS. 20 to 22.

In such an embodiment, the supporting member of the camera 2 is detachably attached to the mounting plate and when the apparatus is carried or accommodated, the supporting member and mounting plate are separated. In this manner, the compact-sized apparatus of a small volume can be realized. Thus, the package box to enclose those components can be miniaturized, thereby enabling the transporting expenses of the apparatus to be reduced. Moreover, the accommodating space of the apparatus is decreased and the accommodation efficiency can be also removed.

FIG. 20 is a perspective view of an apparatus of such an embodiment. FIG. 21 is a diagram showing an attaching structure to attach the supporting member 4 to the mounting plate 1.

Figure 21:
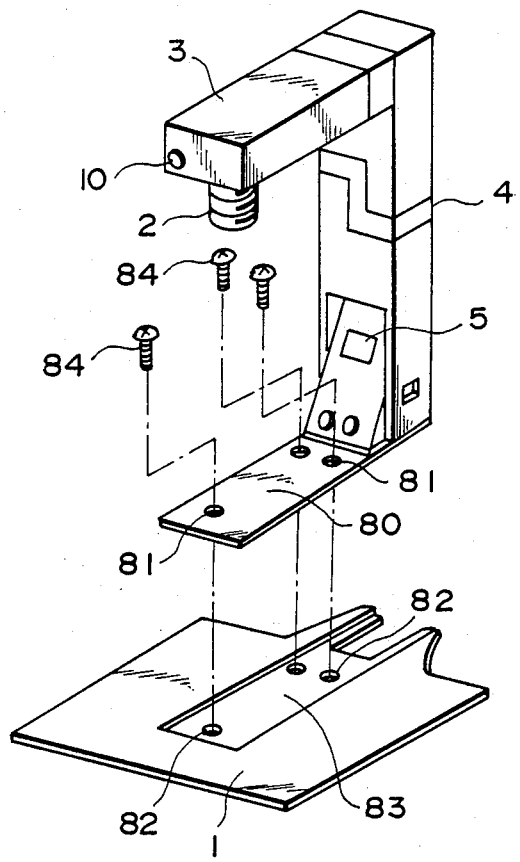
FIG. 21 is an exploded perspective view showing a structure to attach a supporting portion 4 to a mounting plate 1.
Figure 22:
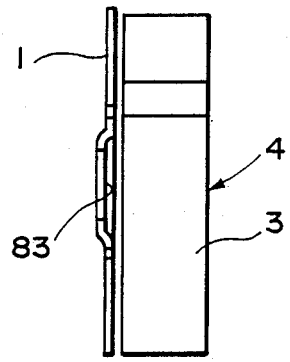
FIG. 22 is a diagram showing a state in which the apparatus of the fourth embodiment is accommodated.

In FIGS. 20 and 21, the same parts and components as those shown in FIG. 1 are designated by the same reference numerals. Referring now to FIGS. 20 and 21, a fixing member 80 is fixed to the lower end surfaces of the vertical supporting member 4 and has the same width and length as those of the horizontal supporting portion 3 of the camera 2. A recess groove 83 is formed in the surface of the mounting plate 1. The fixing member 80 is inserted into the recess groove 83 and positioned. Screw inserting holes 81 are formed in the fixing member 80. Screw holes 82 are formed in the recess groove 83 of the mounting plate 1 at the positions corresponding to the screw inserting holes 81. Screws 84 are inserted into the holes 81 and threaded into the screw holes 82, thereby fixing the vertical supporting member 4 onto the mounting plate 1.

In such a constitution, when the supporting member 4 is fixed onto the mounting plate 1, the fixing member 80 is inserted into the recess groove 83 in the mounting plate 1 and positioned. Thereafter, screws 84 are inserted into the holes 81 and then threaded into the screw holes 2 and fastened. On the contrary, when the supporting member 4 is detached from the mounting plate 1, the fastened screws 84 are loosened.

As described above, in the apparatus of this embodiment, when the apparatus is used, the fixing member 80 is inserted into the recess groove 83 in the mounting plate 1 and screwed and assembled. However, when the apparatus is accommodated or carried, the fixing member can be exploded by releasing the screws. Therefore, the compact-sized apparatus can be realized by arranging the mounting plate 1 along the side of the detached supporting member 4 as shown in FIG. 22, so that the accommodating size of apparatus can be reduced. Thus, the package box can be miniaturized, the cost of transportation can be decreased, the accommodating space can be also reduced, and the accommodation efficiency is improved.

In particular, as mentioned above, according to this embodiment, since the fixing member 80 fixed to the lower end surface of the supporting member 4 has the same width and length as those of the horizontal supporting member 3 of the camera 2, it is convenient to accommodate or carry the apparatus since the mounting plate 1 can be fitted and arranged along the side of the supporting member 4.

Although it is desirable that the width and length of the fixing member 80 are substantially the same as those of the horizontal supporting portion 3 of the camera 2, the fixing member 80 may be apparently narrower or shorter than the horizontal supporting portion 3.

In the above embodiment, the fixing member 80 has been inserted into the recess groove 83 and fixed by the screws 84. However, in place of the recess groove 83, an inserting groove or inserting hole may be formed in the mounting plate 1 and the fixing member 80 may be also inserted and fixed into this groove or hole by fixing pins or the like.

As described above, according to this embodiment, by detachably attaching the supporting member of the image pickup unit onto the mounting plate, the compact-sized apparatus can be realized by separating them upon packaging or carrying. Thus, the package box can be miniaturized. Therefore, it is possible to obtain the image reading apparatus in which the transporting expenses can be reduced, the accommodating space is small, and the accommodation efficiency is good.

What is claimed is:

1. An image reading apparatus comprising:
   (a) a mounting plate for mounting an image to be read;
   (b) supporting means connected to said mounting plate;
   (c) means, supported by said supporting means, for converting the image to an electric signal; and
   (d) monitor display means, supported by said supporting means, for displaying an image on a basis of the electric signal;
   wherein a length of said supporting means is variable, and wherein both said means for converting and said monitor display means are mounted on said supporting means.

2. An image reading apparatus according to claim 1, wherein said converting means is for converting a color image into an electric signal in accordance with a color of the image.

3. An image reading apparatus according to claim 2, wherein said mounting plate is achromatic.

4. An image reading apparatus according to claim 3, wherein said mounting plate is gray and has a reflectance lower than white.

5. An image reading apparatus according to claim 1, wherein said supporting means supports said converting means so as to vary a distance between said converting means and said mounting plate.

6. An image reading apparatus according to claim 1, wherein said supporting means supports said converting means so as to vary a position of said converting means on said mounting plate.

7. An image reading apparatus according to claim 5, wherein said supporting means has a slide portion and varies the distance between said mounting plate and said converting means by sliding said slide portion.

8. An image reading apparatus according to claim 6, wherein said supporting means has a slide portion and supports said converting means so as to vary the position of the converting means on said mounting plate by sliding said slide portion.

9. An image reading apparatus according to claim 5, wherein said supporting means supports said converting means so as to vary the position of the converting means on said mounting plate.

10. An image reading apparatus comprising:
    (a) a mounting plate for mounting an image to be read; and
    (b) means for converting the image on said mounting plate into an electric signal,
    wherein said mounting plate can be folded up to a U-shaped, closed position when said apparatus is not in use.

11. An image reading apparatus according to claim 10, further comprising supporting means for supporting said converting means.

12. An image reading apparatus according to claim 11, wherein said mounting plate includes:
    (a) a fixed plate portion fixed to said supporting means; and
    (b) a movable plate portion which can be folded up with respect to said fixed plate portion.

13. An image reading apparatus according to claim 12, wherein said movable plate portion is coupled with said fixed plate portion by means of a hinge portion.

14. An image reading apparatus according to claim 10, wherein said mounting plate includes holding means for holding said mounting plate in a predetermined state.

15. An image reading apparatus according to claim 14, wherein said holding means is means for holding said mounting plate in an open state.

16. An image reading apparatus according to claim 14, where said holding means is means for holding said mounting plate in a closed state.

17. An image reading apparatus according to claim 14, wherein said holding means has first means for holding said mounting plate in the open state and second means for holding the mounting plate in the closed state.

18. An image reading apparatus comprising:

(a) a mounting plate for mounting an image to be read;

(b) means for converting the image to be read on said mounting plate into an electric signal;

(c) monitor display means for displaying on a basis of the electric signal; and (d) means for supporting said monitor display means so that both the image to be read on said mounting plate and the display on said monitor display means can be simultaneously observed.

19. An image reading apparatus according to claim 18, wherein said supporting means is means for supporting said monitor display means such that the monitor display means faces said mounting plate.

20. An image reading apparatus according to claim 18, wherein said supporting means is means for supporting said converting means together with said monitor display means.

21. An image reading apparatus according to claim 20, wherein said supporting means is means for supporting said converting means above said monitor display means.

22. An image reading apparatus according to claim 21, wherein said supporting means supports said monitor display means such that the monitor display means is inclined with respect to said mounting plate.

23. An image reading apparatus according to claim 18, further comprising:

(a) a terminal to receive an electric signal from the outside; and (b) control means for allowing the electric signal input from said terminal to be displayed by said monitor display means.

24. An image reading apparatus according to claim 23, wherein said control means allows the electric signal input from said terminal and the electric signal from said converting means to be mixed and then be displayed by said monitor display means.

25. An image reading apparatus comprising:

(a) a mounting plate for mounting a color image to be read;

(b) means for converting the color image to be read on said mounting plate into an electric signal responsive to color of said image; and (c) means for adjusting a color balance of the electric signal of said converting means, wherein said mounting plate is achromatic in color for adjustment of the color balance.

26. An image reading apparatus according to claim 25, wherein said mounting plate has a first surface and a second surface on the back side of said first surface, and the colors of said first and second surfaces are achromatic colors.

27. An image reading apparatus according to claim 26, wherein the brightnesses of said first and second surfaces differ.

28. An image reading apparatus comprising:

(a) a mounting plate for mounting an image to be read;

(b) supporting means connected to said mounting plate;

(c) means, supported by said supporting means, for converting the image to an electric signal; and (d) monitor display means, supported by said supporting means, for displaying on a basis of the electric signal, wherein said mounting plate and said supporting means are coupled so that they can be separated.

29. An image reading apparatus according to claim 28, wherein said supporting means has an attaching portion to attach said supporting means to said mounting plate and a supporting portion, coupled with said attaching portion, for supporting said converting means, and wherein said attaching portion and said supporting portion have substantially the same width.

30. An image reading apparatus according to claim 28, wherein said mounting plate and said supporting means are coupled by screws.

* * * * *

UNITED STATES PATENT AND TRADEMARK OFFICE
CERTIFICATE OF CORRECTION

PATENT NO. : 4,825,295

DATED : April 25, 1989

INVENTOR(S) : Ishikawa, et al.

It is certified that error appears in the above-identified patent and that said Letters Patent is hereby corrected as shown below:

[30] FOREIGN APPLICATION PRIORITY DATA
Line 2, change "Feb. 24, 1986 [JP].........61-27488"
to --Feb. 24, 1986 [JP].........61-37488--.

[56] REFERENCES CITED
US Pat. Doc., change "4,636,863  1/1987  Maiyom"
to --4,636,868  1/1987  MaLyon--.

[57] ABSTRACT
Line 1, change "comprising:a" to --comprising: a--.

COLUMN 2
Line 16, change "was" to --is--; and
Line 35, change "feading" to --reading--.

COLUMN 9
Line 5, delete "that".

COLUMN 12
Line 61, change "where" to --wherein--.

Signed and Sealed this

Twentieth Day of February, 1990

Attest:

JEFFREY M. SAMUELS

Attesting Officer       Acting Commissioner of Patents and Trademarks